US011794842B2

United States Patent
Tomimatsu (10) Patent No.: US 11,794,842 B2
(45) Date of Patent: Oct. 24, 2023

(54) FUEL PUMP UNIT COVER AND METHOD OF ATTACHING SAME

(71) Applicant: HONDA MOTOR CO., LTD., Tokyo (JP)

(72) Inventor: Masaru Tomimatsu, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/477,972

(22) Filed: Sep. 17, 2021

(65) Prior Publication Data

US 2022/0089241 A1 Mar. 24, 2022

(30) Foreign Application Priority Data

Sep. 23, 2020 (JP) ................................. 2020-158300

(51) Int. Cl.
*B60K 15/05* (2006.01)
*B62J 35/00* (2006.01)
*F02M 37/10* (2006.01)
*B62J 37/00* (2006.01)
*B60K 15/035* (2006.01)

(52) U.S. Cl.
CPC ............... *B62J 35/00* (2013.01); *B62J 37/00* (2013.01); *F02M 37/103* (2013.01); *B60K 15/03519* (2013.01)

(58) Field of Classification Search
CPC ..... B60K 15/03519; B62J 35/00; B62J 37/00; F02M 37/103
See application file for complete search history.

(56) References Cited

U.S. PATENT DOCUMENTS

| | | | | |
|---|---|---|---|---|
| 5,782,258 A | * | 7/1998 | Herbon | B60K 15/03519 137/202 |
| 6,439,205 B2 | * | 8/2002 | Ushigome | F02M 37/106 137/565.34 |
| 8,001,991 B2 | * | 8/2011 | Theissler | F16K 24/044 137/202 |
| 2005/0194796 A1 | | 9/2005 | Powell | |
| 2012/0298212 A1 | * | 11/2012 | McClure | B60K 15/03519 137/197 |
| 2022/0176811 A1 | * | 6/2022 | Cho | B60K 15/03006 |

FOREIGN PATENT DOCUMENTS

| | | |
|---|---|---|
| CN | 1664347 A | 9/2005 |
| CN | 205104672 U | 3/2016 |
| EP | 1520774 B1 | 11/2006 |

(Continued)

OTHER PUBLICATIONS

Office Action received in corresponding Japanese Application No. 2020-158300 dated Jul. 5, 2022 with English translation (6 pages).

(Continued)

*Primary Examiner* — Gonzalo Laguarda
(74) *Attorney, Agent, or Firm* — Rankin, Hill & Clark LLP (57) ABSTRACT

A fuel pump unit cover that covers a part of a fuel pump unit exposed to the outside of a fuel tank includes opening holes, and is provided as an elastically deformable member. The opening area of the opening holes is smaller than the sum of the cross-sectional areas of components (fuel pipe and wiring harness) passing through the opening holes.

4 Claims, 8 Drawing Sheets

(56) References Cited

FOREIGN PATENT DOCUMENTS

| JP | 2009-235977 A | 10/2009 |
| JP | 4367913 B2 | 11/2009 |
| JP | 2014-190167 A | 10/2014 |
| WO | 2016/082996 A1 | 6/2016 |

OTHER PUBLICATIONS

Office Action received in corresponding CN application No. 202110967576.5 dated Nov. 23, 2022 with English translation (23 pages).
"Cost-Oriented Product Design: The Way to Reduce Cost Design", Zhong Yuan, pp. 159-160, Mechanical Industry Press, 1st edition, Apr. 2020, 4 pages; (Discussed in English translation of Chinese Office Action attached).
Chinese Office Action received in corresponding CN application No. 202110967576.5 dated May 11, 2023; English translation included (12 pages).

* cited by examiner

FUEL PUMP UNIT COVER AND METHOD OF ATTACHING SAME

BACKGROUND

Technical Field

The present invention relates to a fuel pump unit cover provided on a fuel pump unit and a method of attaching the same.

Related Art

For example, Patent Literature 1 discloses a cover (setting plate) for a motorcycle that covers an upper surface of a fuel pump inserted into a fuel tank.

The cover disclosed in has a lid that covers a central opening in the fuel tank, and includes a disk-shaped member with a plurality of bolt holes provided in an outer circumferential portion. The lid is provided with a discharge pipe opening extended from the fuel pump unit and a wiring opening through which a harness is inserted.

PRIOR ART DOCUMENT(S)

Patent Literature(s)

Patent Literature 1: JP 4367913 B

SUMMARY

However, the cover disclosed in Patent Literature 1 requires a large opening for work so that the discharge pipe and the harness can be connected after the cover is attached to the upper surface of the fuel tank via bolts.

In addition, there is a possibility that water droplets are led into the cover along the discharge pipe opening and the wiring opening. Therefore, an electrical connection to the harness needs to be an expensive one with high waterproofness. Furthermore, the fuel pump unit itself may deteriorate depending on the nature of water droplets.

The present invention has been made in view of the above points, and an object thereof is to provide a fuel pump unit cover that is inexpensive, prevents deterioration, and can improve waterproofness, and a method of attaching the same.

In order to achieve the above object, the present invention provides a fuel pump unit cover that covers a part of a fuel pump unit exposed to an outside of a fuel tank, the fuel pump unit cover including an opening hole, an edge of the opening hole being provided as an elastically deformable member, in which an opening area of the opening hole is smaller than a sum of cross-sectional areas of components passing through the opening hole.

Further, the present invention provides a method of attaching a fuel pump unit cover that covers a part of a fuel pump unit exposed to an outside of a fuel tank, the fuel pump unit cover including a first cover and a second cover, the first cover having a first side wall extending toward the second cover, the second cover having a second side wall extending toward the first cover, the method including: attaching the first cover to an upper surface of the fuel pump unit; connecting a component to a connection located on the upper surface of the fuel pump unit; and attaching the second cover to an opening in the first cover.

According to an embodiment of the present invention, it is possible to obtain a fuel pump unit cover that is inexpensive, prevents deterioration, and can improve waterproofness, and a method of attaching the same.

DETAILED DESCRIPTION

Next, an embodiment of the present invention will be described in detail with reference to the drawings as appropriate. In each drawing, "up/down" indicates a vehicle up-down direction (vertical direction).

Figure 1:
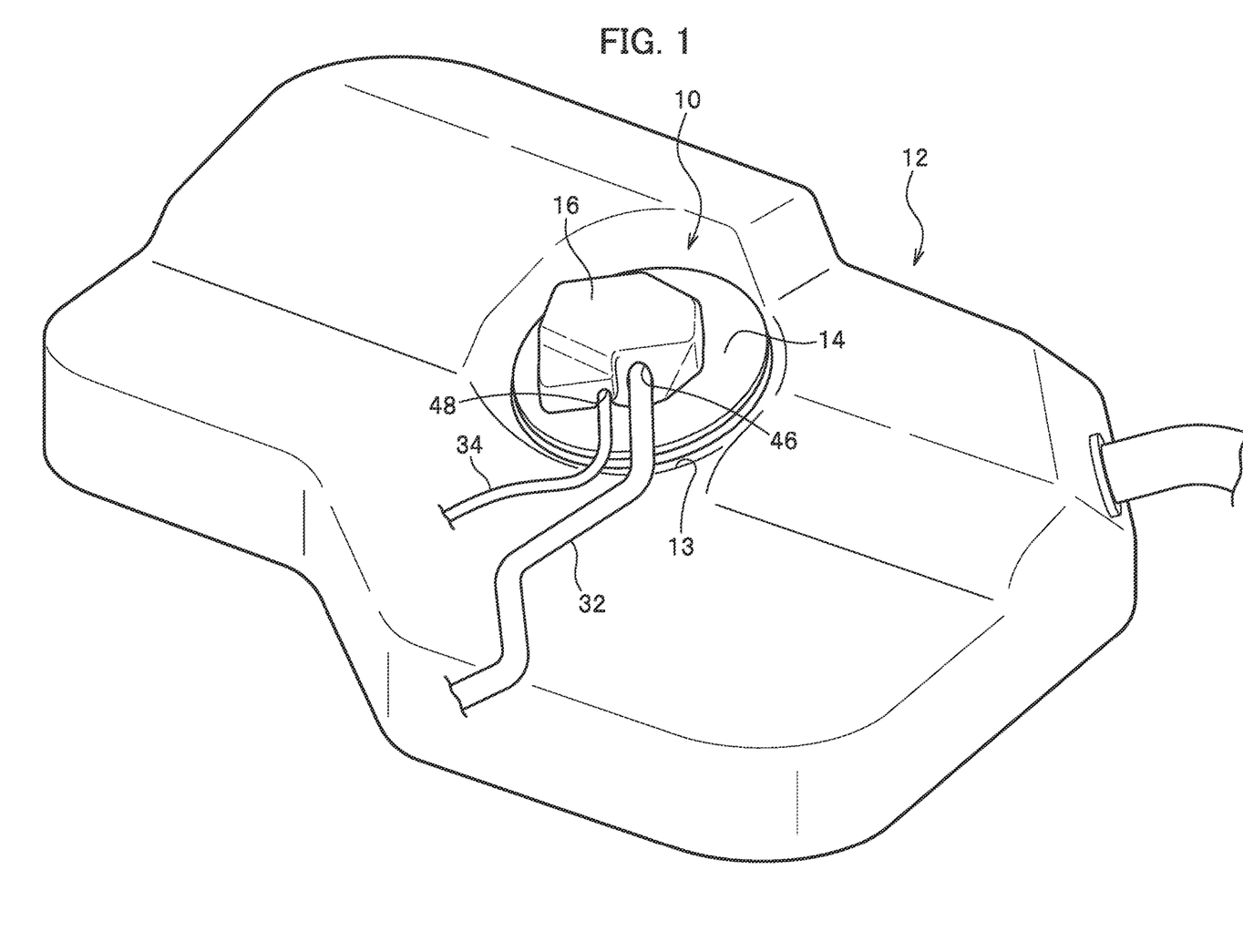
FIG. 1 is a perspective view showing a fuel tank equipped with a fuel pump unit cover according to an embodiment of the present invention.

As shown in FIG. 1, a fuel pump unit cover 10 (hereinafter simply referred to as the "cover 10") according to an embodiment of the present invention is attached to a substantially central portion of the upper surface of a fuel tank 12, and covers a part of the fuel pump unit (not shown) exposed to the outside of the fuel tank 12. Provided in a substantially central portion of the upper surface of the fuel tank 12 is an opening 13 having a circular shape in plan view.

Figure 9A:
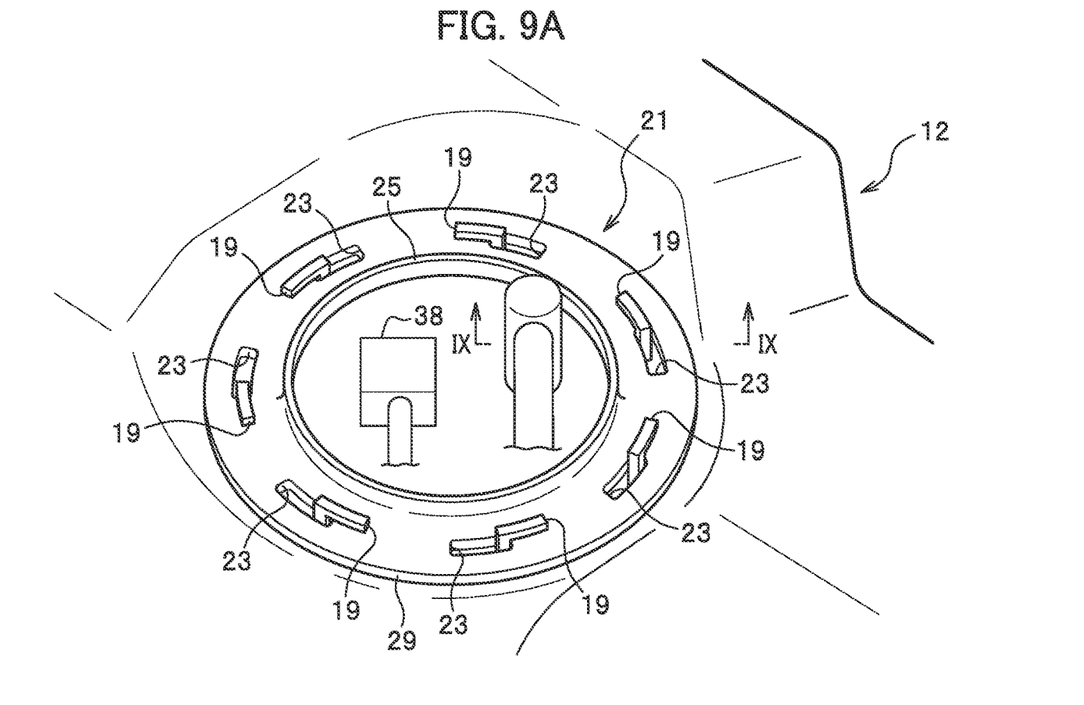
FIG. 9A is a perspective view showing a lock ring and an insert ring for fixing the first cover to the fuel tank.
Figure 9B:
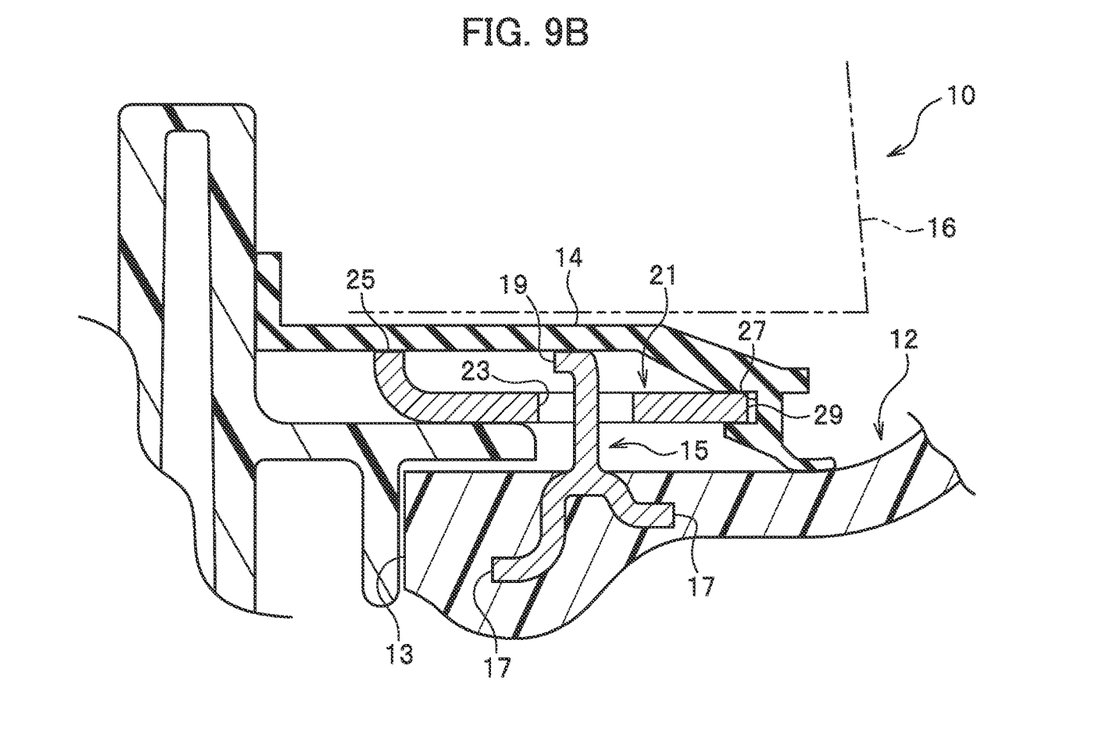
FIG. 9B is an enlarged end view taken along line IX-IX in FIG. 9A.

As shown in FIG. 9B, a part of an insert ring 15 is embedded in a portion of the fuel tank 12 near the opening 13 having a circular shape. The insert ring 15 is composed of an insert ring lower portion and an insert ring upper portion that are integrally formed. The insert ring lower portion includes an annular branch piece 17 branching into an inner diameter side and an outer diameter side. The insert ring lower portion is embedded (insert-molded) in the upper surface of the fuel tank 12 and fixed to the upper surface of the fuel tank 12. The insert ring upper portion is constituted by a plurality of locking claws 19 exposed from the upper surface of the fuel tank 12 and disposed apart from each other along the circumferential direction. The locking claws 19 each have a substantially L-shaped key form as viewed from the side, and extend along the circumferential direction.

As shown in FIGS. 9A and 9B, a lock ring 21 having an annular shape is provided above the upper surface of the fuel tank 12. The lock ring 21 has a plurality of claw insertion holes 23 disposed at regular intervals along the circumferential direction, through which the locking claws 19 of the insert ring 15 pass. The lock ring 21 is located over the insert ring 15 such that the locking claws 19 pass through the claw insertion holes 23, and the lock ring 21 is rotated in the clockwise direction in plan view, by which the lock ring 21 is fixed to the insert ring 15 via the locking claws 19 (see FIG. 9A). Accordingly, the lock ring 21 is fixed to the fuel tank 12 via the insert ring 15. Note that the fuel pump unit (not shown) is incorporated in the fuel tank 12.

As shown in FIG. 9B, the lock ring 21 has an inner diameter flange 25 and an outer circumferential edge 29. The inner diameter flange 25 abuts on the lower surface of a first cover 14 described later and supports the first cover 14 from below. The outer circumferential edge 29 is attached to an inner annular groove 27 provided in the circumferential inner diameter portion of the first cover 14. The first cover 14 is fixed to the fuel tank 12 via the lock ring 21 and the insert ring 15 located below the first cover 14.

Figure 2:
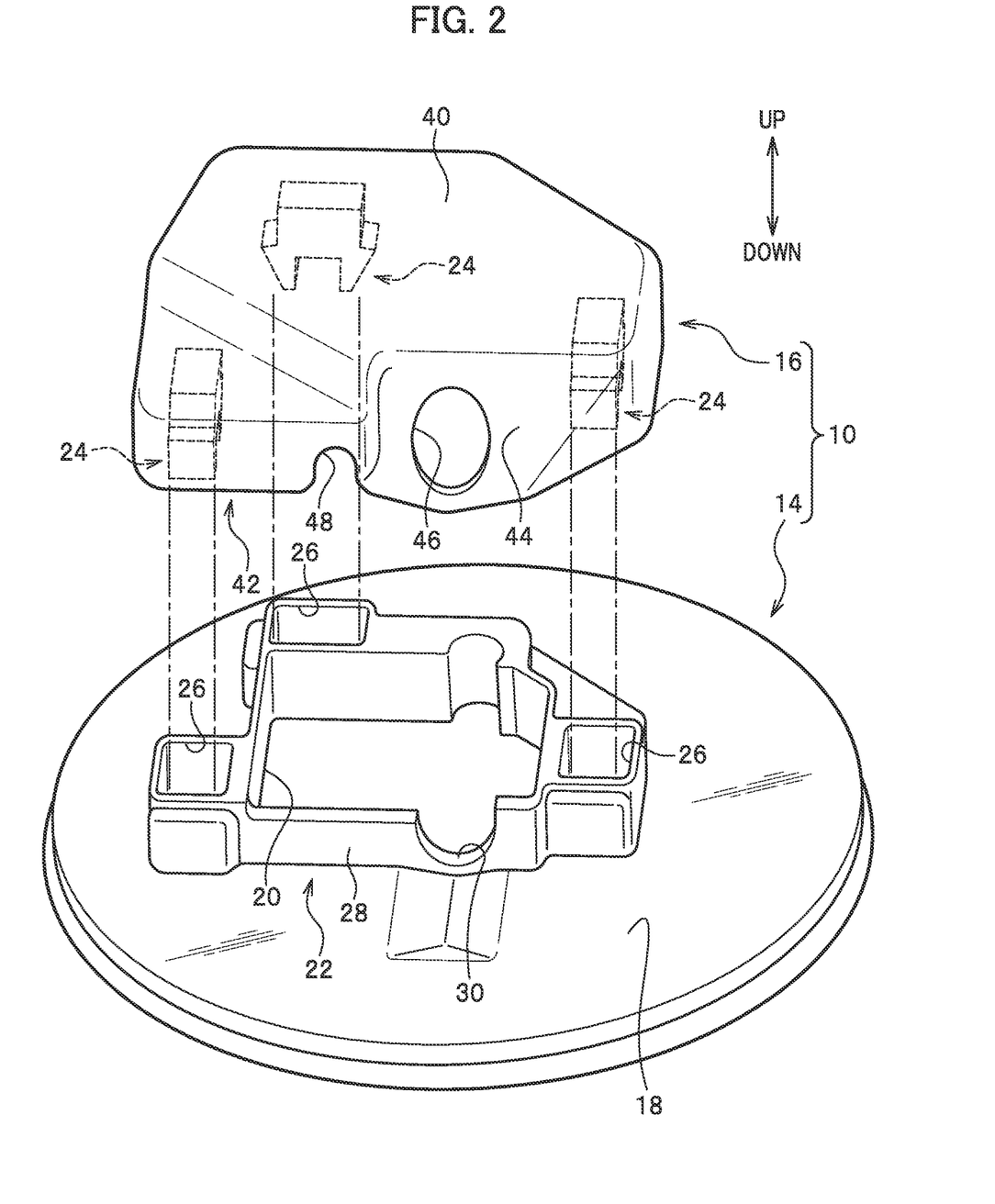
FIG. 2 is a partially transparent enlarged exploded perspective view showing a first cover and a second cover constituting the fuel pump unit cover according to an embodiment of the present invention.

The cover 10 is made of, for example, an elastically deformable member such as rubber. However, the material of the cover 10 is not limited to rubber. As shown in FIG. 2, the cover 10 includes the first cover 14 located on the lower side and a second cover 16 located on the upper side in the vertical direction. The first cover 14 and the second cover 16 have a fitting structure that allows the first cover 14 and the second cover 16 to be fit with each other. This fitting structure will be described in detail later.

In the present embodiment, both the first cover 14 and the second cover 16 are made of rubber. Alternatively, for example, the first cover 14 may be made of resin, and only the second cover 16 may be made of rubber.

As shown in FIG. 2, the first cover 14 includes a main body 18 having a disk shape that covers the upper surface of the fuel pump unit (not shown). Provided in a substantially central portion of the main body 18 is an opening 20 having a substantially trapezoidal shape in plan view. The opening 20 penetrates through the main body 18 from the upper surface to the lower surface thereof.

The main body 18 is provided with a first side wall 22 surrounding the opening 20 and extending toward the second cover 16. Parts of the first side wall 22 close to the fitting structure are elastically deformable. The first side wall 22 includes two walls substantially orthogonal to each other in a substantially L shape in plan view, and a wall connecting the ends of the two walls. The first side wall 22 is provided with a plurality of fitting holes (recesses) 26 with which claws (protrusions) 24 of the second cover 16 described later are fit. In the present embodiment, three fitting holes (recesses) 26 are disposed, but the present invention is not limited thereto.

As shown in FIG. 2, one wall 28 out of the two walls of the first side wall 22 orthogonal to each other in a substantially L shape includes a recess 30 having a substantially semicircular shape as viewed from the side and depressed toward the upper surface of the main body 18. To the recess 30, a fuel pipe 32 described later is attached (see FIG. 3).

Figure 3:
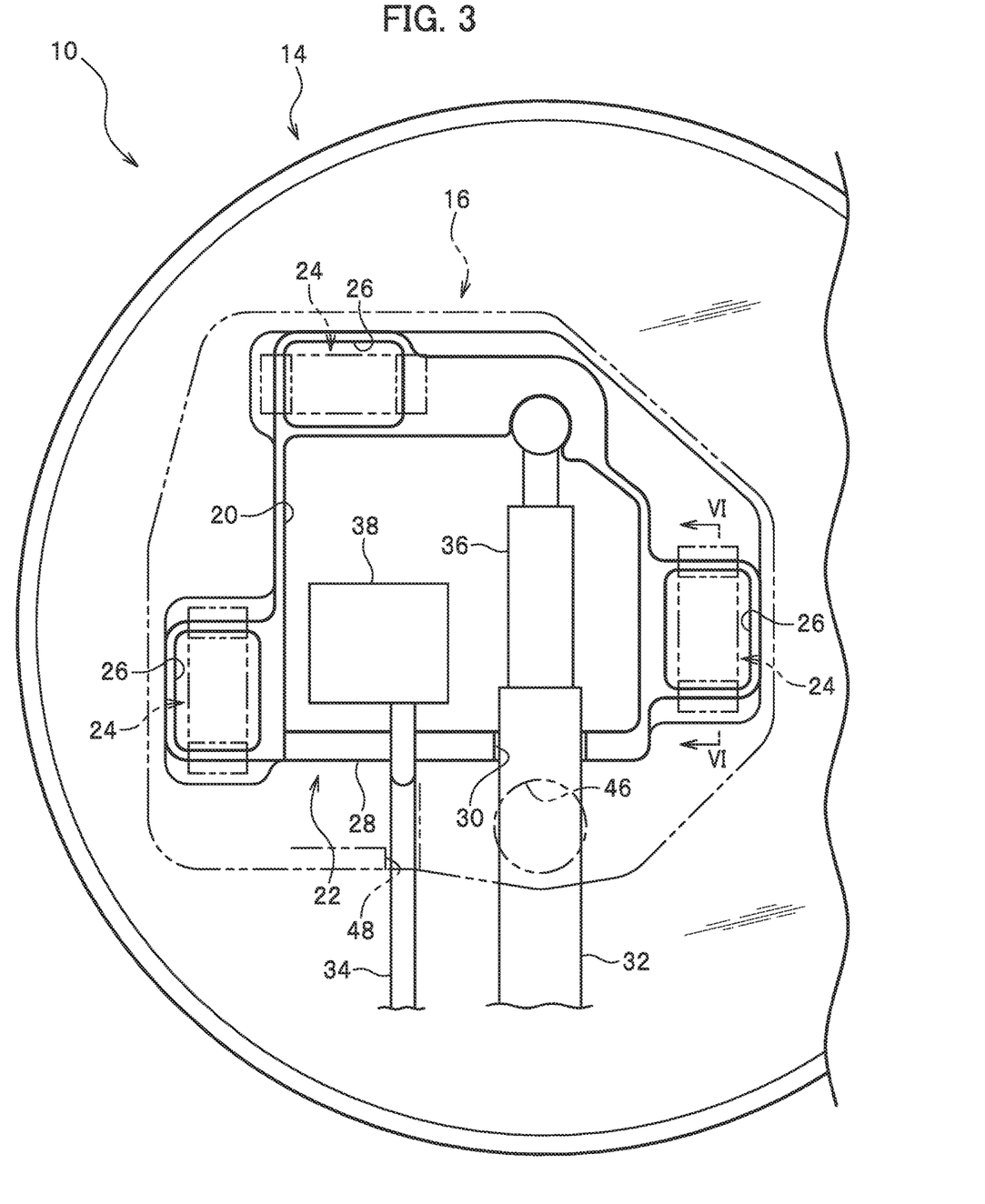
FIG. 3 is a partially transparent plan view showing the fuel pump unit cover shown in FIG. 2.

As indicated by an imaginary line (two-dot chain line) in FIG. 3, the second cover 16 is attached to the opening 20 in the first cover 14 from above, and covers at least part of connections 36 and 38 of the fuel pump unit connected to components (fuel pipe 32 and wiring harness 34). As shown in FIG. 2, the second cover 16 has a ceiling wall 40 forming the upper surface, and a second side wall 42 extending from the peripheral edge of the ceiling wall 40 toward the first cover 14. The second side wall 42 is elastically deformable.

Figure 4:
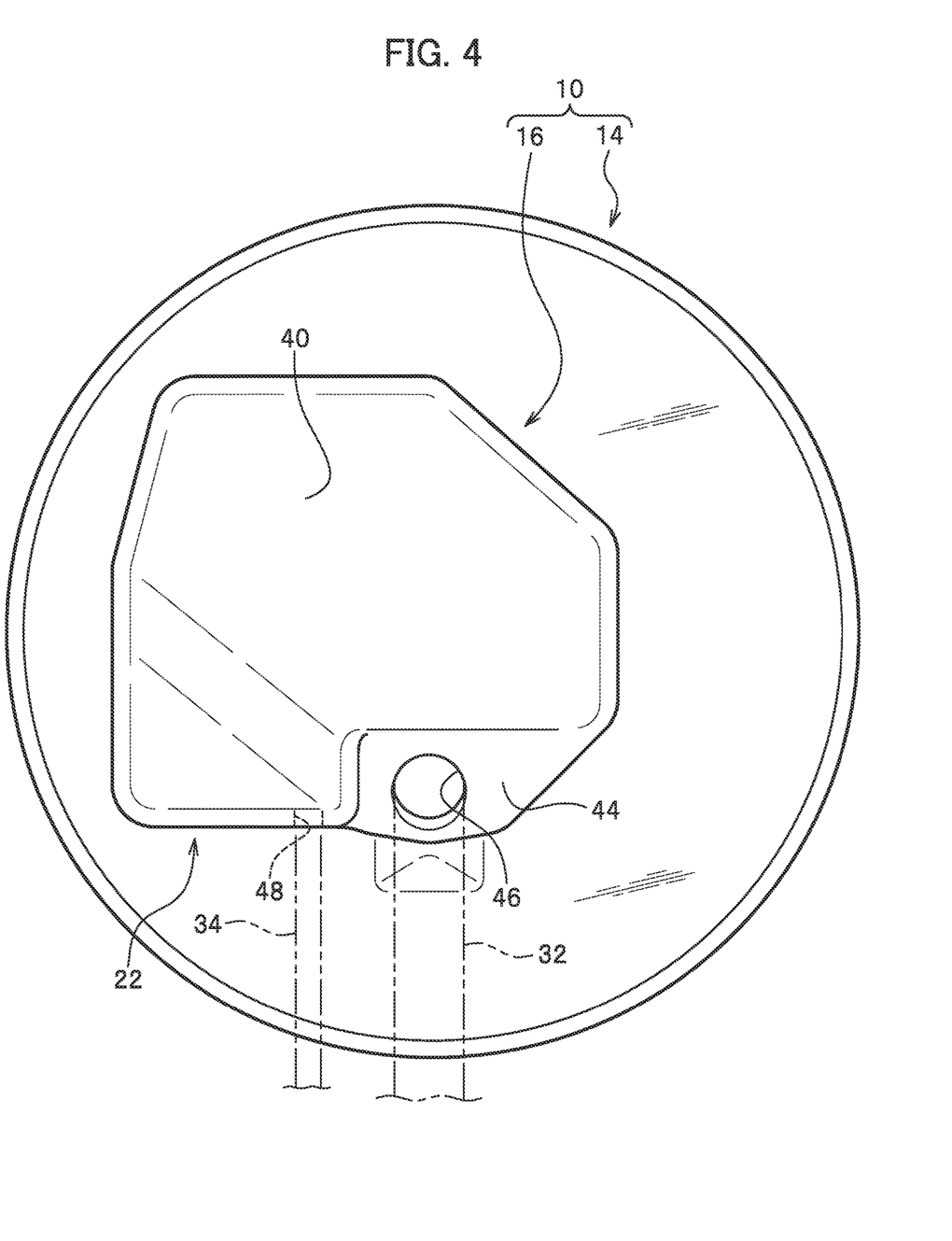
FIG. 4 is a plan view showing a first opening hole and a second opening hole provided in a second side wall of the second cover.

Provided on a part of the second side wall 42 is an inclined surface 44 inclined downward (toward the first cover 14) from the ceiling wall 40 (see FIG. 4). The inclined surface 44 includes a first opening hole 46 having a substantially oval shape in plan view. Further, at a position close to the first opening hole 46, the second side wall 42 has a second opening hole 48 cut out in a substantially arc shape toward the upper side (ceiling wall 40). The opening area of the first opening hole 46 is smaller than a cross-sectional area of the fuel pipe 32 taken in parallel with the inclined surface 44.

As shown in FIG. 3, the first opening hole 46 in the second cover 16 located on the outer side and the recess 30 in the first cover 14 located on the inner side are located close to each other at corresponding positions. Note that the first cover 14 located on the inner side is not provided with anything corresponding to the second opening hole 48 in the second cover 16 located on the outer side. That is, the inside of the second opening hole 48 is sealed by the first side wall 22 of the first cover 14, and the wiring harness 34 is connected to the connection 38 over the upper end of the first side wall 22 (see FIG. 3).

The first opening hole 46 functions as an insertion hole through which the fuel pipe 32 passes. The second opening hole 48 functions as an insertion hole through which the wiring harness 34 passes. The fuel pipe 32 and the wiring harness 34 function as "components passing through the opening hole" in the claims. One end of the fuel pipe 32 is connected to the fuel pump unit (not shown) in the fuel tank 12 via the connection for fuel (for example, a pipe joint) 36. The other end of the fuel pipe 32 is connected to the engine (not shown). One end of the wiring harness 34 is connected to the motor of the fuel pump unit, various sensors, and the like (not shown) via the connection for wiring (connector) 38. The other end of the wiring harness 34 is connected to the battery device (not shown).

The sum of the opening areas of the first opening hole 46 and the second opening hole 48 (the opening area of the first opening hole 46+the opening area of the second opening hole 48) is set to be smaller than the sum of the cross-sectional areas of the fuel pipe 32 and the wiring harness 34 that pass through the first opening hole 46 and the second opening hole 48, respectively. That is, the opening area of the first opening hole 46 is smaller than the cross-sectional area of the fuel pipe 32, and the opening area of the second opening hole 48 is smaller than the cross-sectional area of the wiring harness 34.

Functions and effects thereof will be described in detail later.

With the first cover 14 and the second cover 16 integrally assembled, the first side wall 22 and the second side wall 42 are located overlapping each other on the inner side and the outer side. The first side wall 22 of the first cover 14, which is the lower one of the first cover 14 and the second cover 16, is located inside the second side wall 42 of the second cover 16, which is the upper one of the two. That is, the second side wall 42 of the second cover 16 is located outside the first side wall 22 of the first cover 14, and is configured to surround the first side wall 22 located inside (see FIGS. 6, 2, and 3).

Figure 6:
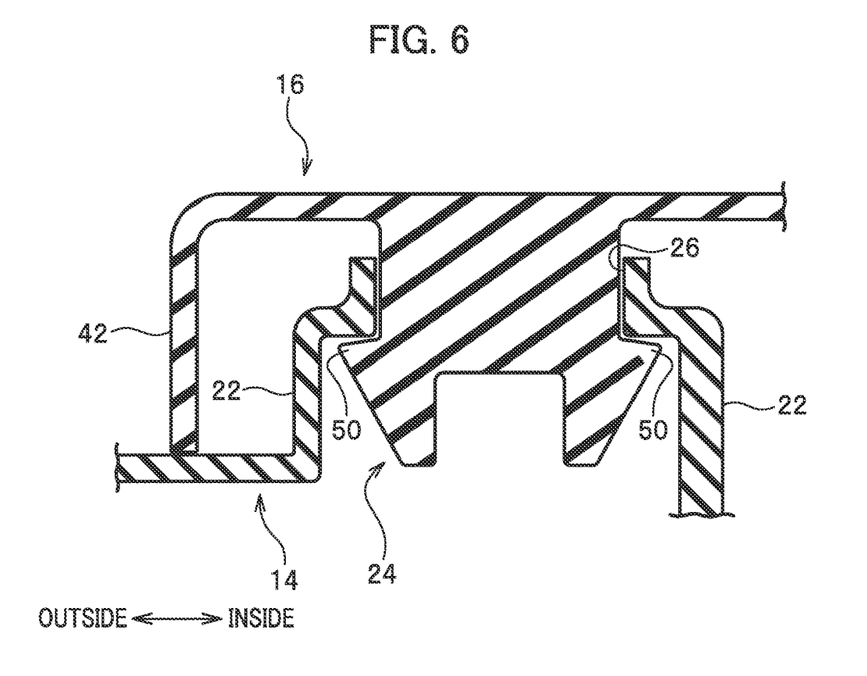
FIG. 6 is an enlarged cross-sectional view taken along line VI-VI in FIG. 3, showing the claw of the second cover fit into the fitting hole in the first cover.

Next, the fitting structure between the first cover 14 and the second cover 16 will be described. As shown in FIG. 6, the fitting structure includes the fitting holes 26 and the claws 24, which are respectively a plurality of recesses provided in the first cover 14 and a plurality of protrusions provided on the second cover 16.

The claws 24, which are protrusions projecting toward the first cover 14, are provided inside the ceiling wall 40 of the second cover 16 located on the upper side. The claws 24 are disposed at three positions corresponding to the fitting holes 26 in the first cover 14 located on the lower side. The claws 24 are made of rubber and formed integrally with the second cover 16. The claws 24 each have the same configuration, and include a locking portion 50 that is elastically deformed to be fit into the corresponding fitting hole 26, and is elastically deformed to expand after passing through the fitting hole 26. The locking portion 50 prevents the claw 24 from dropping out of the fitting hole 26.

Figure 5:
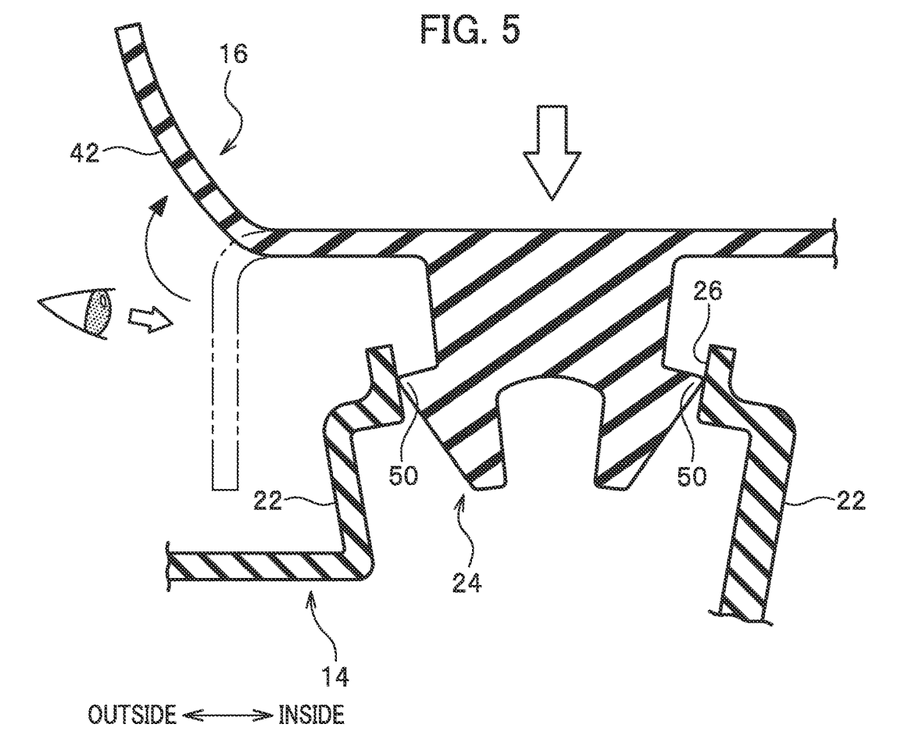
FIG. 5 is an enlarged cross-sectional view showing the second side wall of the second cover turned upward when a claw of the second cover is fit into a fitting hole in the first cover.

Parts of the second side wall 42 of the second cover close to the fitting structure are bendable when the claws 24 are fit into the fitting holes 26. Accordingly, when fitting the second cover 16 into the first cover 14, the worker can conduct the attachment work while visually recognizing the fitting portions by turning up the second side wall 42 of the second cover 16 (compare the two-dot chain line and the solid line in FIG. 5).

The fuel pump unit cover 10 according to the present embodiment is basically configured as described above, and functions and effects thereof will be described below.

The fuel pipe 32 is connected to the connection 36 by being fit into the first opening hole 46 in the second cover 16 located on the outer side and into the recess 30 in the first cover 14 located on the inner side. In addition, the wiring harness 34 is connected to the connection 38 by being fit into the second opening hole 48 in the second cover 16 located on the outer side and then getting over the upper end of the first side wall 22 of the first cover 14 located on the inner side.

In the present embodiment, the sum of the opening areas of the first opening hole 46 and the second opening hole 48 (the opening area of the first opening hole 46+the opening area of the second opening hole 48) is set to be smaller than the sum of the cross-sectional areas of the fuel pipe 32 and the wiring harness 34 that pass through the first opening hole 46 and the second opening hole 48, respectively.

In the present embodiment, the second cover 16 is made of an elastically deformable member (for example, a rubber material), and has an opening area smaller than the cross-sectional area of the components (fuel pipe 32 and wiring harness 34) passing through the first opening hole 46 and the second opening hole 48. This enables the components (fuel pipe 32 and wiring harness 34) to pass through the enlarged first opening hole 46 and second opening hole 48, and enables the first opening hole 46 and the second opening hole 48 to be in close contact with the outer circumferential surfaces of the components (fuel pipe 32 and wiring harness 34) due to the contraction force of the elastic member. Thus, the present embodiment provides a fuel pump unit cover that is inexpensive, prevents deterioration, and can improve waterproofness by preventing entry of water through the first opening hole 46 and the second opening hole 48.

Figure 7:
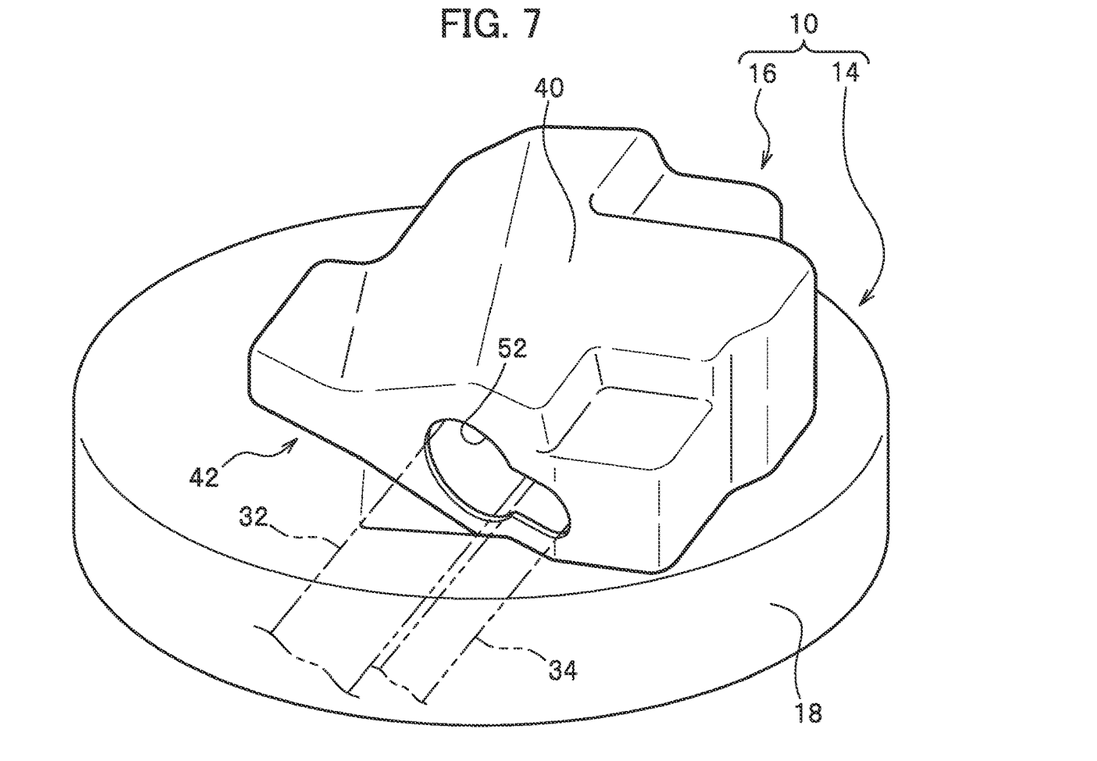
FIG. 7 is a perspective view showing another embodiment in which the first opening hole and the second opening hole in the second cover are formed as a single opening hole.
Figure 8:
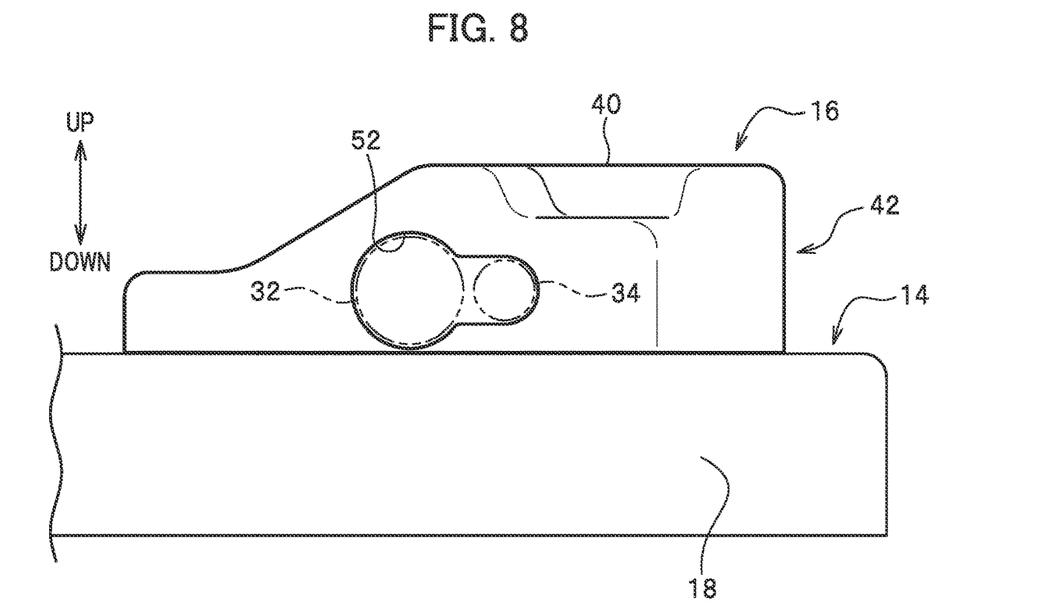
FIG. 8 is a side view showing the single opening hole in FIG. 7 as viewed from the side.

In the present embodiment, the first opening hole 46 and the second opening hole 48 are independently provided as separate parts, but the present invention is not limited thereto. For example, as shown as another embodiment in FIGS. 7 and 8, the first opening hole 46 and the second opening hole 48 may communicate with each other to form a single opening hole 52. A plurality of components (fuel pipe 32 and wiring harness 34) are fit into the single opening hole 52.

In the present embodiment, the cover 10 includes the first cover 14 that covers the upper surface of the fuel pump unit (not shown) and has the opening 20, and the second cover 16 that is attached to the opening 20 in the first cover 14 and covers at least part of the connections 36 and 38 connected to the components (fuel pipe 32 and wiring harness 34). The first cover 14 has the first side wall 22 extending toward the second cover 16, and the second cover 16 has the second side wall 42 extending toward the first cover 14. With the first cover 14 and the second cover 16 assembled, the first side wall 22 and the second side wall 42 are located overlapping each other on the inner side and the outer side of the cover 10. In the present embodiment, the second side wall 42 of the second cover 16 on the upper side is located on the outer side of the cover 10, and the first side wall 22 of the first cover 14 on the lower side is located on the inner side of the cover 10. That is, the second side wall 42 of the second cover 16 is located outside the first side wall 22 of the first cover 14.

In the present embodiment, because the first cover 14 covering the upper surface of the fuel pump unit (not shown) and the second cover 16 closing the opening 20 and covering the connections 36 and 38 provided in the opening 20 overlap each other in the vertical direction, entry of water into the opening 20 can be suitably prevented.

In the present embodiment, because the first cover 14 is located on the lower side and the second cover 16 is located on the upper side, the second side wall 42 of the second cover 16 is located outside the first side wall 22 of the first cover 14. Thus, water droplets sliding along the upper surface of the main body 18 of the first cover 14 are prevented from entering the opening 20 by the first side wall 22 of the first cover 14. Furthermore, because the second side wall 42 provided on the outer periphery of the second cover 16 extends toward the first cover 14, water droplets on the upper surface or outer peripheral surface of the second cover 16 fall onto the upper surface of the main body 18 of the first cover 14, and are suitably prevented from entering the opening 20.

Furthermore, in the present embodiment, the second side wall 42 of the second cover 16 includes the second opening hole 48 through which the wiring harness 34 passes, and the inside part corresponding to the second opening hole 48 is sealed by the first side wall 22 of the first cover 14. Thus, even if water or water droplets enter through the second opening hole 48, the first side wall 22 of the first cover 14 can suitably prevent entry into the opening 20.

In the present embodiment, the first cover 14 and the second cover 16 have the fitting structure that allows the first cover 14 and the second cover 16 to be fit with each other. Parts of the second side wall 42 of the second cover 16 close to the fitting structure are elastically deformable so as to be turned upward.

The present embodiment adopts the fitting structure with which the claws 24 provided on the second cover 16 are fit into the fitting holes 26 provided in the first cover 14. When the second cover 16 is assembled to the first cover 14, because the first side wall 22 of the first cover 14 is elastically deformable, the first side wall can be turned outward and elastically deformed (flexibly bent). Thus, the worker can conduct the assembly work while visually recognizing (checking and/or positioning) the fitting portions between the fitting holes 26 and the claws 24, which can improve the work efficiency of the assembly work.

Figure 10:
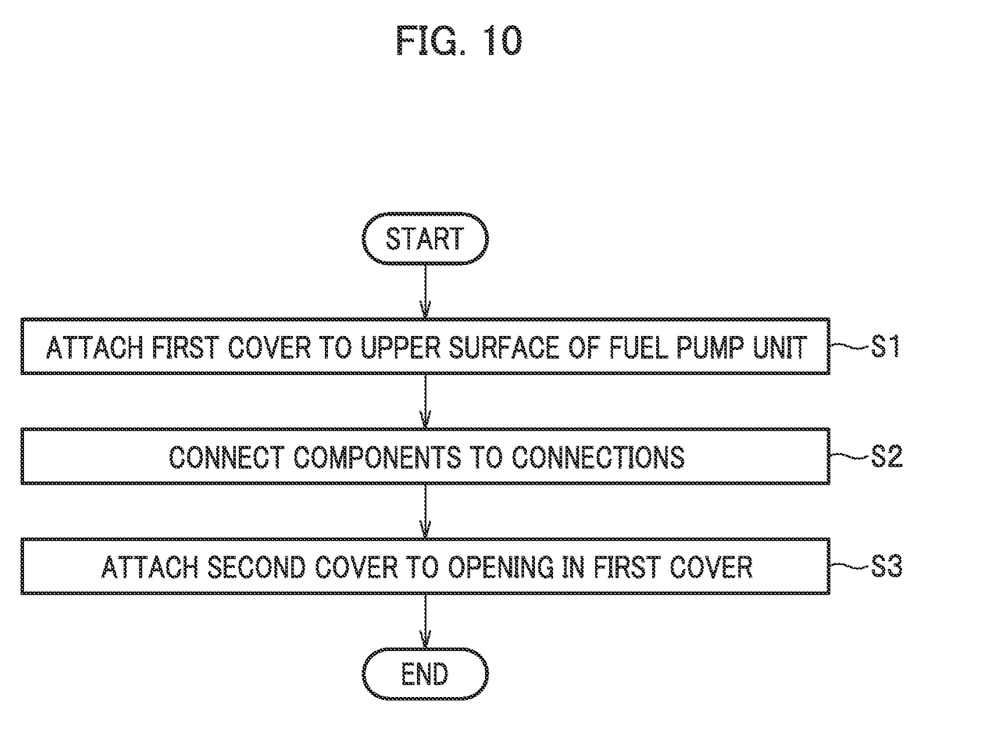
FIG. 10 is a flowchart showing a method of attaching a fuel pump unit cover in which the second cover is attached to the first cover.

Next, a method of attaching the fuel pump unit cover 10 that covers a part of the fuel pump unit exposed to the outside of the fuel tank 12 will be described with reference to the flowchart shown in FIG. 10.

First, the first cover 14 is attached to the upper surface of the fuel pump unit (not shown) (step S1). The attachment of the first cover 14 can include, for example, attaching the first cover 14 to the upper surface of the fuel tank 12 by putting the outer circumferential edge 29 of the metallic lock ring 21 fixed to the fuel tank 12 into the inner annular groove 27 provided in the circumferential inner diameter portion of the first cover 14 (see FIG. 9B).

Due to the limited work space in the vehicle body, the first cover 14 is preferably attached before the fuel tank 12 is mounted on the vehicle body. Further, the fuel tank 12 with the first cover 14 is mounted on the vehicle body. Next, components (for example, the fuel pipe 32 and the wiring harness 34) are connected to the connections 36 and 38 located on the upper surface of the fuel pump unit (step S2). Note that the fuel pipe 32 is fit into the first opening hole 46 before the wiring harness 34. Further, the second cover 16 is attached to the opening 20 in the first cover 14 using the fitting structure including the claws 24 and the fitting holes 26 (step S3).

In the present embodiment, when components (for example, the fuel pipe 32 and the wiring harness 34) are connected to the connections 36 and 38 in step S2, the opening 20 is not closed with the second cover 16, so that the component connecting work can be easily conducted. In addition, because the first side wall 22 of the first cover 14 covering the upper surface of the fuel pump unit and the second side wall 42 of the second cover 16 covering the connections 36 and 38 overlap each other on the inner side and the outer side of the fuel pump unit cover 10, entry of water or water droplets into the opening 20 can be suitably prevented.

In the present embodiment, the second cover 16, 16a is integrally formed, but the second cover 16, 16a may be divided into two according to the arrangement of the connections 36 and 38.

In the present embodiment, the cover 10 is attached to the lock ring 21, but the cover 10 is applicable to other types of fuel tanks. For example, in a case where a fuel pump unit is fixed to a fuel tank using a lock nut (not shown), the cover 10 can be fixed to the fuel tank by press-fitting the cover 10 into the lock nut (not shown).

Furthermore, the fuel pump unit cover 10 according to the present embodiment is applicable to all fuel pump units with the fuel tank 12, whether for vehicles such as automobiles and motorcycles or non-vehicles such as ships.

What is claimed is:

1. A fuel pump unit cover that covers a part of a fuel pump unit exposed to an outside of a fuel tank, the fuel pump unit cover comprising:
    a first cover that covers a surface of the fuel pump unit and has an opening; and
    a second cover that is attached to the opening of the first cover and covers at least part of connections connected to components, wherein
    the first cover has a first side wall extending toward the second cover,
    the second cover has a second side wall extending toward the first cover,
    at least one of the first side wall and the second side wall has an opening hole, an edge of the opening hole being provided as an elastically deformable member,
    an opening area of the opening hole is smaller than a sum of cross-sectional areas of the components passing through the opening hole,
    the first cover is provided with fitting holes which are a plurality of recesses,
    the second cover is provided with claws which are protrusions projecting toward the first cover,
    the claws are formed integrally with the second cover, and
    the claws each include a locking portion that is elastically deformed to be fit into a corresponding fitting hole, of the fitting holes, and is elastically deformed to expand after passing through the fitting hole.

2. The fuel pump unit cover according to claim 1, wherein
    the first side wall and the second side wall are located overlapping each other on an inner side and an outer side, and
    the side wall of an upper one of the first cover and the second cover is located outside the side wall of a lower one.

3. The fuel pump unit cover according to claim 2, wherein the opening hole is provided in the second side wall.

4. The fuel pump unit cover according to claim 2, wherein
    the first cover has the fitting holes and the second cover has the claws such that the fitting holes and the claws form a fitting structure that allows the first cover and the second cover to be fit with each other, and
    a part of the second side wall of the second cover close to the fitting structure is bendable.

* * * * *